United States Patent
Kemp et al.

(10) Patent No.: US 7,373,301 B2
(45) Date of Patent: May 13, 2008

(54) METHOD FOR DETECTING EMOTIONS FROM SPEECH USING SPEAKER IDENTIFICATION

(75) Inventors: Thomas Kemp, Remseck (DE); Ralf Kompe, Fellbach (DE); Raquel Tato, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 862 days.

(21) Appl. No.: 10/209,134

(22) Filed: Jul. 31, 2002

(65) Prior Publication Data

US 2003/0028384 A1 Feb. 6, 2003

(30) Foreign Application Priority Data

Aug. 2, 2001 (EP) ................... 01118608

(51) Int. Cl.
*G10L 11/00* (2006.01)
(52) U.S. Cl. .............. 704/275; 704/270.1; 704/246
(58) Field of Classification Search ............... 704/270, 704/275, 231, 246, 251, 273, 235, 245, 270.1; 713/100
See application file for complete search history.

(56) References Cited

U.S. PATENT DOCUMENTS 6,332,122 B1* 12/2001 Ortega et al. ............... 704/270
6,463,415 B2* 10/2002 St. John ..................... 704/273
6,629,242 B2* 9/2003 Kamiya et al. ............. 713/100
6,795,808 B1* 9/2004 Strubbe et al. ............. 704/275

FOREIGN PATENT DOCUMENTS

EP 1 076 329 2/2001

OTHER PUBLICATIONS

Slaney et al: "Baby Ears: A Recognition System for Affective Vocalizations" Acoustics, Speech and Signal Processing, 1998: Proceedings of the 1998 IEEE International Conference on Seattle, WA, USA May 12-15, 1998, New York, NY, USA, IEEE, US, May 12, 1998, pp. 985-988, XP010279287.
Doddington G R et al: "The Nist Speaker Recognition Evaluation—Overview, Methodology, Systems, Results, Perspective" Speech Communication, Elsevier Science Publishers, Amsterdam, NL, vol. 31, No. 2-3, Jun. 2000, pp. 225-254, XP004205054.

* cited by examiner

*Primary Examiner*—Huyen X. Vo
(74) *Attorney, Agent, or Firm*—Oblon, Spivak, McClelland, Maier & Neustadt, P.C.

(57) ABSTRACT

To reduce the error rate when classifying emotions from an acoustical speech input (SI) only, it is suggested to include a process of speaker identification to obtain certain speaker identification data (SID) on the basis of which the process of recognizing an emotional state is adapted and/or configured. In particular, speaker-specific feature extractors (FE) and/or emotion classifiers (EC) are selected based on said speaker identification data (SID).

11 Claims, 2 Drawing Sheets

US 7,373,301 B2

METHOD FOR DETECTING EMOTIONS FROM SPEECH USING SPEAKER IDENTIFICATION

DESCRIPTION

The present invention relates to a method for detecting emotions from speech, a system for carrying out the method, and a computer program product to carry out the method. In particular, the present invention relates to a method for detecting emotions from an acoustical speech input of at least one speaker using speaker identification techniques to reduce the error rate of emotion detecting.

In many applications, it is desired to detect the current emotional state of a human speaker, e.g. of a user of an equipment or the like. Many methods for detecting the emotional state of a human being have been described. Many of these known methods employ and evaluate different sources of features, visual sources, acoustical sources, and other physiological sources, e.g. tension, humidity, and temperature of the skin, blood pressure, the rate of the beating heart, and/or the like. In the case of acoustical speech input, however, emotion detection is a very difficult problem, because the inter-speaker variants of emotional speech is very high. Corresponding probability distributions therefore strongly overlap within different speakers. Consequently, prior art classification schemes suffer from relatively high error rates in the classification of emotions based on acoustical speech input only.

It is an object of the present invention to provide a method for detecting emotions from acoustical speech which has a reduced classification error rate.

This object is achieved by a method for detecting emotions from acoustical speech input with the characterizing features of claim 1. The object is also achieved by a system for carrying out the method according to the features of claim 13. Preferred embodiments of the inventive method for detecting emotions are within the scope of the respective dependent subclaims.

According to the invention, in the method for detecting emotions from acoustical speech input a process of speaker identification is carried out on the given acoustical speech input. From the speaker identification process, speaker identification and/or classification data are obtained. A process of recognizing an emotional state or a change thereof of said speaker from said acoustical speech input is adapted and/or configured according to said speaker identification and/or classification data. This is in particular done so as to reduce an error rate of the process of recognizing said emotional state.

In contrast to prior art methods for detecting emotions from acoustical speech input, the inventive method involves a process of speaker identification to obtain speaker identification data and takes into account the speaker dependency of some features used to express emotions. It is a further aspect of the present invention to make the process of recognizing emotions or of recognizing an emotional state of the speaker or a change thereof dependent on the result of the process of speaker identification and in particular dependent on the obtained speaker identification and/or classification data. According to the present invention, it is therefore possible to adapt and/or to configure the emotion-recognizing process according to the actual speaking situation of the current speaker. Consequently, the burden of classifying emotions can tremendously be reduced as the process of recognizing an emotional state is directly focused on the subspace of the space of all emotions describing a particular user or a particular class of users being comparable to each other.

According to a preferred embodiment of the present invention, a predetermined set of speaker-specific emotion recognizers is employed each of said speaker-specific emotion recognizers being assigned to a specific speaker or a class of specific speakers.

Additionally, a process of recognizing an emotional state is adapted and/or configured by selecting a speaker-specific emotion recognizer as a current emotion recognizer based on said speaker identification and/or classification data, so as to perform a process of recognizing an emotional state focused on a distinct, certain, and relevant emotional subspace.

According to a further aspect of the present invention, a speaker data base of speakers already described and/or identified is employed in the process of speaker identification. It is also possible to enrich the given speaker data base during the application of the method or in an additional learning or training phase.

If a new speaker has to be evaluated by the method for detecting emotions, the result should not be worse than the results which can be obtained by conventional methods. Therefore, a speaker-independent emotion recognizer is selected as said current emotion recognizer to perform the emotion detection for the case that said speaker identification and/or classification data indicate that the current speaker has not been identified. In that certain case, a speaker-independent emotion detection is automatically performed.

The same holds if the speaker identification data indicate that the current speaker has not been identified and/or is not similar to one of the speakers or speaker clusters associated to the speaker dependent classifiers. Then a speaker independent classifier is used.

According to a further embodiment of the inventive method, in each of said speaker-specific emotion recognizers at least one process of feature extraction or a feature extractor and at least one process of emotion classification or an emotion classificator are involved.

It is of particular advantage that said process of recognizing an emotional state is adapted and/or configured by selecting the speaker-specific feature extractor. Alternatively or additionally, a speaker-specific emotion classificator based on said speaker identification and/or classification data may be selected in the process of adapting and/or configuring the process of recognizing an emotional state.

Said process of speaker identification can be carried out in a preprocessing step and on the entire speech input or on a part thereof.

In contrast, said processes of speaker identification and/or of adapting the emotion recognition are carried out during the performance of the inventive method and, in particular, essentially continuously and/or in a real-time or online manner, so as to increase the rate of speaker identification and/or so as to consider speaker changes. According to these measures, the inventive method is enabled to learn from the incoming speech input and to find the best approximation of, or the exact speaker. Performing speaker identification and emotion recognition adaptation in an online or real-time manner increases the chance that a change of the speaker can be detected so that a new emotion recognition adaptation is performed when a new speaker enters.

According to a further embodiment of the present invention, said process of recognizing an emotional state is carried out on the entire speech input, in particular in a postprocessing step, so as to increase the rate of emotion detection.

Alternatively, said process of recognizing an emotional state is carried out essentially continuously and/or in a real-time or an online manner so as to consider changes in the emotional state and/or an emotional orbit or time-course.

These last two measures can be applied in situations where the entire speech input, in particular a small phrase or sentence or the like, reflects a certain and fixed emotional state. In contrast, the last measure ensures the possibility to follow the actual emotional state within its orbit in the space of all possible emotions as the current emotional state may change within the time course of a larger speech input.

Based on the last measures described, it is a further aspect of the invention to have the method for detecting emotions from acoustical speech input configured to consider a plurality of essentially simultaneous speakers, so as to follow the time courses of the emotional states or the emotional orbits of the simultaneous speakers, in particular during a conversation, a discussion, and/or the like.

It is a further aspect of the present invention to provide a system, an apparatus, a device, and/or the like for detecting emotions from acoustical speech input which is, in each case, capable of performing and/or realize the inventive method for detecting emotions from acoustical speech input and/or its steps.

According to a further aspect of the present invention, a computer program product is provided, comprising computer program means which is adapted to perform and/or to realize the inventive method for detecting emotions or its steps when it is executed on the computer, a digital signal processing means, and/or the like.

Further aspects of the present invention become more apparent from the following remarks:

For many applications it is desirable to be able to detect the current emotional state of a user by analyzing audiovisual cues, e.g. speech and/or a video picture from the user. In the case of speech, however, emotion detection is a very difficult problem, because the inter-speaker variance of emotional speech is very high and the corresponding probability distributions strongly overlap. The proposed solution to overcome these problems is to use a speaker Identification system, in particular prior to the emotion detection engine, and to have a set of specialized speaker-dependent emotion classifiers in addition to one speaker-independent one. This can greatly reduce the classification error rate.

It is the first time that the problem of emotion recognition given only audio or audiovisual cues can successfully be solved. The classification error rate of current systems are still very high and do not provide enough performance for real-world applications.

It is proposed to use a speaker identification system prior to emotion recognition. The emotion from the speaker identification system is used to select one out of a given set of speaker-specific emotion recognizers. The speaker-specific emotion recognizers can use different features—employ different preprocessing—and can benefit from the much smaller intra-speaker variance for classification. The underlying probability distributions for the emotions that are to be recognized overlap much less than in conventional cases which makes the classification problem intrinsically much less difficult and thereby allows for improved recognition rates and/or reduced model complexity.

Both feature extraction and the classifier itself can be modified by the result of the decision of the speaker identification system, in particular in the case of a similar speaker. It also possible to modify only one of them. Finally, in the case of an unclear or out-of-domain result from the speaker identification system, there might be no modification at all: "Call back" to the speaker-independent emotion classifier and a speaker-independent way of feature extraction.

The latter behavior ensures that the performance of the modified system will be at least as good as the performance of the conventional system.

The speaker independent emotion recognizer can be constructed by averaging over all the speakers' data during training. The speaker-dependent emotion recognizers can either be constructed by using only the data from the given speaker or by adapting the speaker-independent emotion classifier with the speaker-specific data.

The invention offers improved emotion classification performance for a set of enrolled speakers or similars. For unknown speakers, the classification performance is not harmed in any way but it is the same as without using the invention. The invention can readily be employed, since the necessary base technologies—namely speaker identification and speaker rejection—are already available.

In the following, further advantages and aspects of the present invention will be described taken reference to the accompanying figures.

BRIEF DESCRIPTION OF DRAWINGS

FIG. 1 is a schematical block diagram showing a preferred embodiment of the inventive method for emotion detection on the basis of received acoustical speech input.

Figure 1:
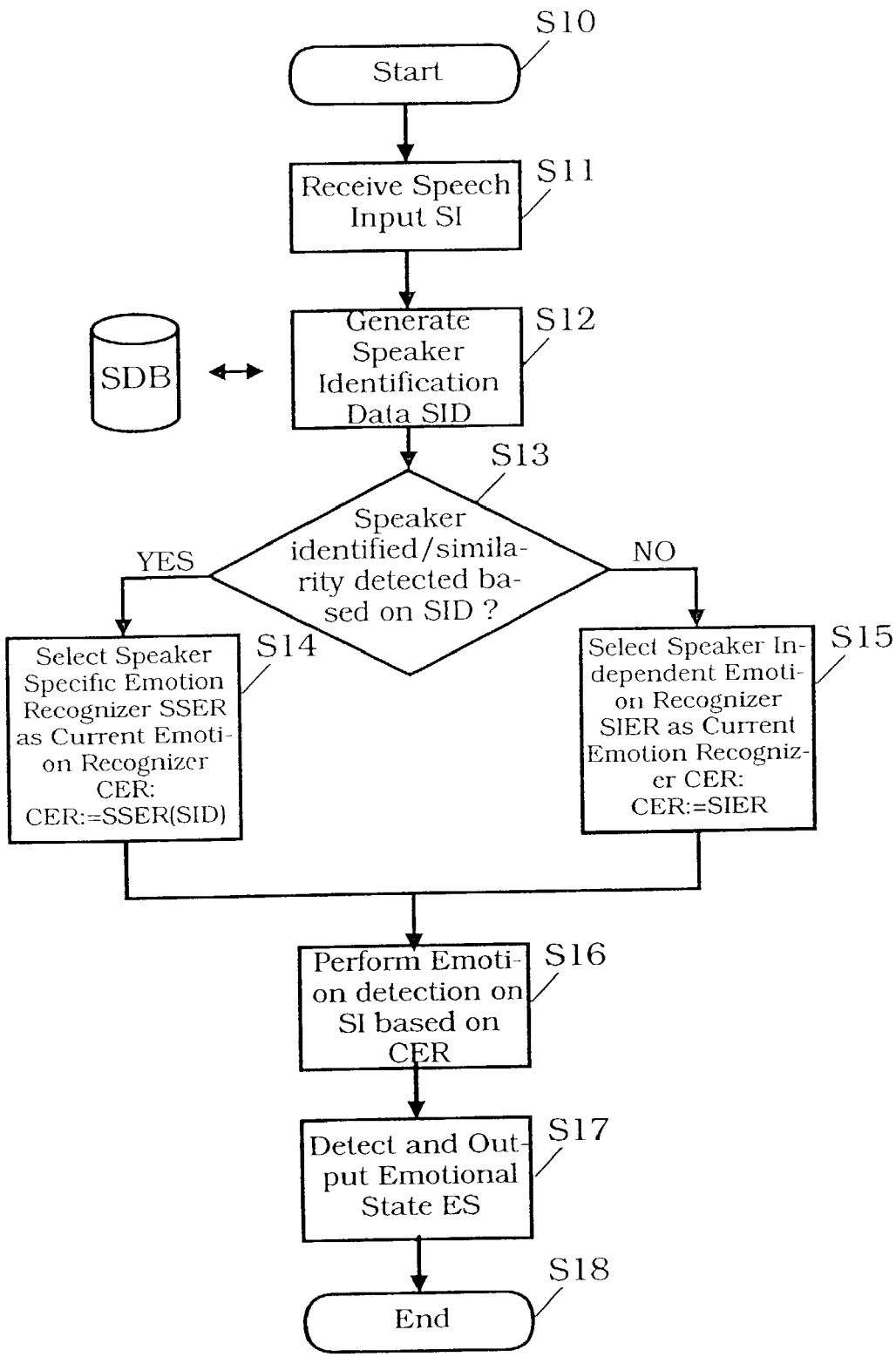
FIG. 1 is a schematical block diagram describing a preferred embodiment of the inventive method for detecting emotions from acoustical speech.

In step S10 of the method described in FIG. 1, all preliminary and preparing steps are summarized.

In step S11 of FIG. 1, an acoustical speech input SI is received and/or preprocessed, namely filtered, digitized, stored, and/or the like.

In step S12 based on said received acoustical input SI, a process of a speaker identification is performed. Said speaker identification is based on a given and preset speaker data base SDB and yields speaker identification and/or classification data SID.

In the following step S13, it is decided whether the obtained speaker identification and/or classification data SID classify a specific speaker already contained in the given speaker data base SDB if there is some degree to similarity with a given speaker or if an unknown speaker has to be assumed. In the case of an unknown speaker, the method continues with selecting as a current emotion recognizer CER a conventional and speaker-independent emotion recognizer in step S15.

Otherwise, i.e. in the case that the obtained speaker identification and/or classification data SID identify a certain and distinct speaker already contained in the given speaker data base SDB, the method of FIG. 1 continues with step S14 by selecting as a current emotion recognizer CER a speaker-specific emotion recognizer SSER(SID) as a function of or being dependent on the obtained speaker identification and/or classification data SID.

On the basis on the selected current emotion recognizer CER—being a speaker-specific or a speaker-independent one—a process of emotion detection is performed in step S16. The result of the emotion detection is output as an emotional state ES in step S17, and the process is then completed with step S18.

Figure 2:
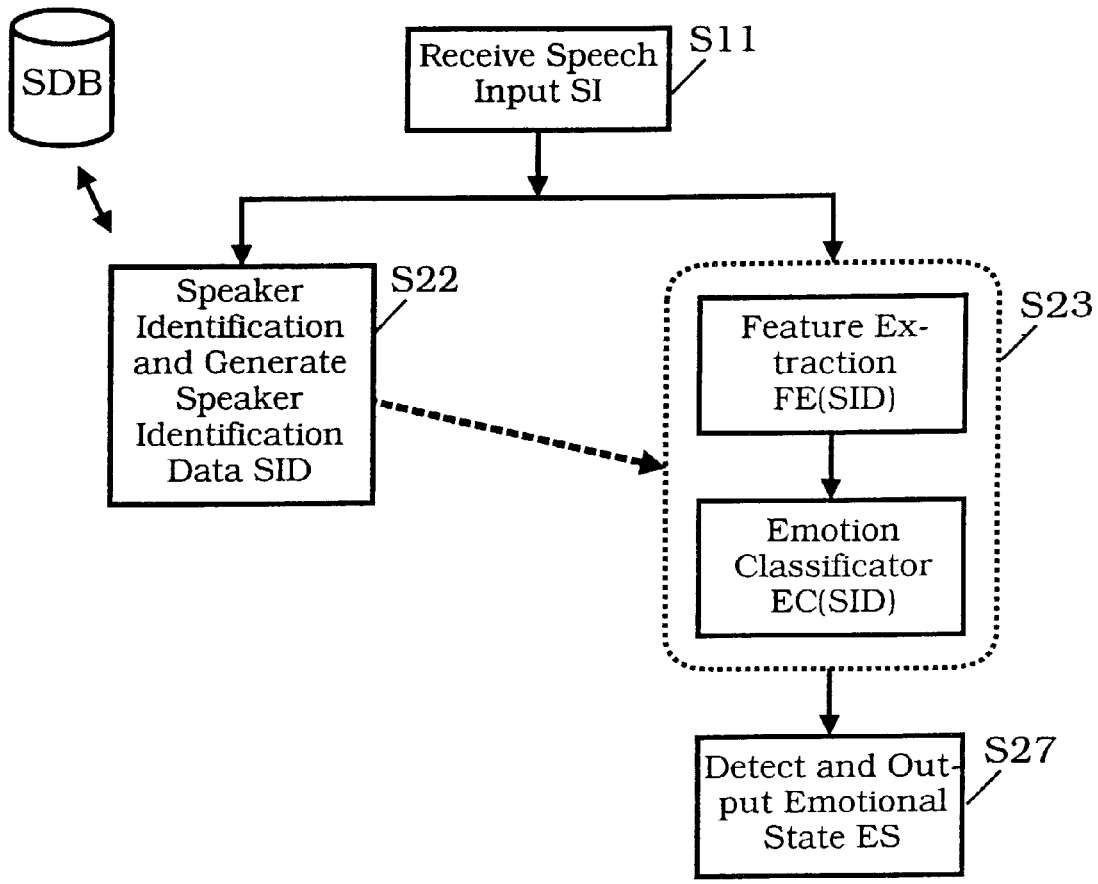
FIG. 2 is a schematical block diagram showing some details with respect to the adaptation of the speaker-specific emotional recognizer.

FIG. 2 is a schematical block diagram which elucidates the influence of the above described speaker identification on the process of emotion detection, step S16 in FIG. 1.

Based on a speech input SI of step S21 which has to be preprocessed in the manner as described above, a speaker identification is performed in step S22 yielding speaker identification and/or classification data SID.

The received speech input SI of step S21 is also introduced to a emotion recognizer ER to yield an emotional state ES 27 in FIG. 2.

The emotion recognizer of step S23 is dependent on or a function of the obtained speaker identification and/or classification data SID: ER:=ER(SID).

In the case that said speaker identification and/or classification data SID are assigned to a specific speaker already given in a preset speaker data base SDB, the emotion recognizer ER(SID) is a speaker-specific emotion recognizer SSER. On the other hand—i.e. in the case where the obtained speaker identification and/or classification data SID do not belong to a known speaker already contained in the given speaker data base SDB and/or its properties are not similar to any other speaker—said emotion recognizer ER(SID) is a speaker-independent emotion recognizer SIER.

As, in each case, the selected current emotion recognizer at least comprises a feature extractor FE and an emotion classifier EC, at least one of them or both may be dependent on or functions of said obtained speaker identification and/or classification data SID: FE:=FE(SID) and/or EC:=EC(SID).

The invention claimed is:

1. A method for detecting emotions from speech input of at least one speaker,
   identifying a given speech input so as to obtain speaker identification;
   recognizing an emotional state of said speaker from said speech input by selecting a speaker-independent emotion recognizer when a current speaker has not been identified, and selecting a speaker-dependent emotion recognizer when a current speaker is identified; and
   wherein the speaker-independent emotion recognizer includes emotion models trained in advance by a plurality of speakers, and wherein the speaker-dependent emotion recognizer includes emotion models trained in advance by the identified speaker.

2. The method according to claim 1,
   wherein a predetermined set of speaker-specific emotion recognizers (SSER) is employed, and
   each of said speaker-specific emotion recognizers (SSER) is assigned to a specific speaker.

3. The method according to claim 2, wherein in each of said speaker-specific emotion recognizers (SSER) at least one process of feature extraction or a feature extractor (FE) and one process of emotional classification or an emotion classificator (EC) are involved.

4. The method according to claim 2, wherein said process of recognizing an emotional state is adapted or configured by selecting a speaker-specific feature extractor (FE) or a speaker-specific emotion classificator (EC) based on said speaker identification.

5. The method according claim 1, wherein a speaker data base (SDB) of speakers already described or identified is employed in the process of speaker identification.

6. The method according to claim 1, wherein said process of speaker identification is carried out in a preprocessing step, on the entire speech input (SI) or a part thereof.

7. The method according to claim 1, wherein said processes of speaker identification and of adapting the emotion recognition are carried out essentially continuously or in a real-time or online manner, so as to increase the rate of speaker identification or so as to consider speaker changes.

8. The method according to claim 1, wherein said process of recognizing an emotional state is carried out on the entire speech input (SI) in a post-processing step, so as to increase the rate of emotion detection.

9. The method according to claim 1, wherein said process of recognizing an emotional state is carried out essentially continuously or in a real-time or online manner, so as to consider changes in the emotional state or to consider an emotional orbit or time-course.

10. The method according to claim 1 which is configured to consider a plurality of essentially simultaneous speakers so as to follow a time-course of the emotional states or the emotional orbits of the speakers during a conversation and a discussion.

11. A system for detecting emotions from a speech input, which is capable of performing and realizing a method for detecting emotions according to claim 1 and the steps thereof.

* * * * *